US012731807B2

(12) United States Patent
Ekkert et al.

(10) Patent No.: US 12,731,807 B2
(45) Date of Patent: Sep. 8, 2026

(54) ELECTROLYTE REGENERATION FOR REDOX FLOW BATTERIES BASED ON FERROCYANIDE AND/OR FERRICYANIDE SALTS

(71) Applicant: CMBlu Energy AG, Alzenau (DE)

(72) Inventors: Olga Ekkert, Hanau (DE); Evgeny Larionov, Hanua (DE); Jan Hartwig, Alzenau (DE); Eduard Baal, Offenbach (DE)

(73) Assignee: CMBlu Energy AG, Alzenau (DE)

( * ) Notice: Subject to any disclaimer, the term of this patent is extended or adjusted under 35 U.S.C. 154(b) by 551 days.

(21) Appl. No.: 18/036,557

(22) PCT Filed: Nov. 30, 2020

(86) PCT No.: PCT/EP2020/083958

§ 371 (c)(1),
(2) Date: May 11, 2023

(87) PCT Pub. No.: WO2022/111837

PCT Pub. Date: Jun. 2, 2022

(65) Prior Publication Data

US 2024/0014427 A1 Jan. 11, 2024

(51) Int. Cl.
*H01M 8/18* (2006.01)

(52) U.S. Cl.
CPC .................................. *H01M 8/188* (2013.01)

(58) Field of Classification Search
CPC .................................................... H01M 8/188
See application file for complete search history.

(56) References Cited

U.S. PATENT DOCUMENTS

| | | | |
|---|---|---|---|
| 1,916,627 | A | 7/1933 | Mersch |
| 1,963,383 | A | 6/1934 | Rogers |
| 3,389,124 | A | 6/1968 | Sparks |

(Continued)

FOREIGN PATENT DOCUMENTS

| | | | |
|---|---|---|---|
| CN | 101475758 | A | 7/2009 |
| CN | 102040483 | A | 5/2011 |

(Continued)

OTHER PUBLICATIONS

International Search Report from corresponding PCT Application No. PCT/EP2020/083958 dated Sep. 7, 2021.

(Continued)

*Primary Examiner* — Matthew J Merkling
(74) *Attorney, Agent, or Firm* — Harness Dickey & Pierce P.L.C.

(57) ABSTRACT

The present invention provides a process for the regeneration of an aqueous electrolyte solution of a redox-flow battery containing at least one inorganic redox active compound, said process comprising at least one of the following steps (a), (b) and/or (c): (a) treatment of the electrolyte solution in order reduce the at least one inorganic redox active compound to the reduced state; (b) removal of precipitated material from the electrolyte solution and subsequent modification of the precipitated material to obtain at least one water soluble inorganic redox active compound; and/or (c) separation of inorganic redox active compounds from redox active compounds other than the at least one inorganic redox active compound.

21 Claims, 3 Drawing Sheets

(56) References Cited

U.S. PATENT DOCUMENTS

| | | | | |
|---|---|---|---|---|
| 3,646,071 | A | 2/1972 | Frey et al. | |
| 4,124,606 | A | 11/1978 | Anello et al. | |
| 4,420,644 | A | 12/1983 | Huibers et al. | |
| 4,579,943 | A | 4/1986 | Kamide et al. | |
| 4,608,435 | A | 8/1986 | Howell | |
| 4,956,244 | A | 9/1990 | Shimizu et al. | |
| 4,973,720 | A | 11/1990 | Saito et al. | |
| 5,002,634 | A | 3/1991 | Dimmel et al. | |
| 5,049,477 | A | 9/1991 | Nakamura et al. | |
| 5,712,416 | A | 1/1998 | Gessner | |
| 5,723,675 | A | 3/1998 | Joo et al. | |
| 5,932,752 | A | 8/1999 | Keshavaraja et al. | |
| 5,944,953 | A | 8/1999 | Lavoie et al. | |
| 9,548,509 | B2 | 1/2017 | Anderson et al. | |
| 10,777,836 | B1 * | 9/2020 | Wei | H01M 8/04201 |
| 11,008,284 | B2 | 5/2021 | Krawczyk et al. | |
| 11,225,756 | B2 | 1/2022 | Krawczyk et al. | |
| 11,450,854 | B2 | 9/2022 | Hartwig et al. | |
| 11,731,945 | B2 | 8/2023 | Geigle et al. | |
| 2001/0028977 | A1 | 10/2001 | Kazacos et al. | |
| 2004/0244925 | A1 | 12/2004 | Tarasenko | |
| 2006/0183016 | A1 | 8/2006 | Kazacos et al. | |
| 2006/0263697 | A1 | 11/2006 | Dahn et al. | |
| 2007/0073076 | A1 | 3/2007 | Lewis et al. | |
| 2010/0086675 | A1 | 4/2010 | Berta et al. | |
| 2011/0144337 | A1 | 6/2011 | Santhosh et al. | |
| 2011/0268652 | A1 | 11/2011 | Machhammer et al. | |
| 2012/0045680 | A1 | 2/2012 | Dong et al. | |
| 2013/0079566 | A1 | 3/2013 | Lin | |
| 2013/0084482 | A1 * | 4/2013 | Chang | H01M 8/0693 429/107 |
| 2013/0116424 | A1 | 5/2013 | Peterson et al. | |
| 2013/0232852 | A1 | 9/2013 | Peterson et al. | |
| 2013/0232853 | A1 | 9/2013 | Peterson et al. | |
| 2014/0028261 | A1 | 1/2014 | Esswein et al. | |
| 2014/0370403 | A1 | 12/2014 | Narayan et al. | |
| 2014/0370405 | A1 * | 12/2014 | Zhang | H01M 8/20 429/418 |
| 2015/0243991 | A1 | 8/2015 | Huskinson et al. | |
| 2016/0009621 | A1 | 1/2016 | Blair | |
| 2016/0013497 | A1 | 1/2016 | Jones et al. | |
| 2016/0032525 | A1 | 2/2016 | Kurple et al. | |
| 2016/0130752 | A1 | 5/2016 | Stigsson et al. | |
| 2016/0197371 | A1 | 7/2016 | Takechi | |
| 2016/0301084 | A1 | 10/2016 | Gendel et al. | |
| 2017/0162916 | A1 | 6/2017 | Guarr et al. | |
| 2018/0079721 | A1 | 3/2018 | Armand et al. | |
| 2018/0097249 | A1 | 4/2018 | Narayan et al. | |
| 2018/0099917 | A1 | 4/2018 | Anthony et al. | |
| 2018/0366757 | A1 | 12/2018 | Wei et al. | |
| 2018/0375142 | A1 | 12/2018 | Zhang et al. | |
| 2019/0152902 | A1 | 5/2019 | Krawczyk et al. | |
| 2019/0245233 | A1 | 8/2019 | Pintauro et al. | |
| 2019/0390405 | A1 | 12/2019 | Geigle et al. | |
| 2019/0393506 | A1 | 12/2019 | Hartwig et al. | |
| 2020/0014040 | A1 | 1/2020 | Kerker et al. | |
| 2020/0283380 | A1 | 9/2020 | Krawczyk et al. | |
| 2020/0373597 | A1 | 11/2020 | Perry et al. | |
| 2021/0020943 | A1 | 1/2021 | Hartwig et al. | |
| 2021/0024453 | A1 | 1/2021 | Hartwig et al. | |
| 2021/0083310 | A1 * | 3/2021 | Perry | H01M 8/0488 |
| 2021/0276945 | A1 | 9/2021 | Krawczyk et al. | |
| 2022/0048869 | A1 * | 2/2022 | Lee | C07D 241/46 |
| 2023/0095542 | A1 | 3/2023 | Geigle et al. | |
| 2023/0097730 | A1 | 3/2023 | Geigle et al. | |
| 2023/0130406 | A1 | 4/2023 | Hartwig et al. | |
| 2023/0304221 | A1 | 9/2023 | Krawczyk et al. | |
| 2023/0411662 | A1 | 12/2023 | Ekkert et al. | |
| 2024/0014409 | A1 | 1/2024 | Geigle et al. | |
| 2024/0270672 | A1 | 8/2024 | Geigle et al. | |
| 2024/0318382 | A1 | 9/2024 | Krawczyk et al. | |
| 2024/0356030 | A1 | 10/2024 | Hartwig et al. | |
| 2025/0263384 | A9 | 8/2025 | Geigle et al. | |

FOREIGN PATENT DOCUMENTS

| | | | | |
|---|---|---|---|---|
| CN | 103000924 | A | 3/2013 | |
| CN | 104005046 | A | 8/2014 | |
| CN | 103762377 | B * | 3/2016 | H01M 8/0482 |
| CN | 107425212 | A * | 12/2017 | H01M 8/188 |
| EP | 3492628 | A1 | 6/2019 | |
| FR | 3030561 | A1 | 6/2016 | |
| GB | 1086522 | A | 10/1967 | |
| GB | 1502275 | A | 3/1978 | |
| JP | S51100064 | A | 9/1976 | |
| JP | S51138666 | A | 11/1976 | |
| JP | S52144662 | A | 12/1977 | |
| JP | H01115068 | A | 5/1989 | |
| JP | H06260204 | A | 9/1994 | |
| JP | H9227499 | A | 9/1997 | |
| JP | 3813864 | B2 | 8/2006 | |
| JP | 2011057636 | A | 3/2011 | |
| JP | 2013254685 | A | 12/2013 | |
| JP | 2019503619 | A | 2/2019 | |
| JP | 2020021732 | A | 2/2020 | |
| RO | 76126 | A2 | 5/1981 | |
| SU | 1129204 | A1 | 12/1984 | |
| WO | 1993006626 | A1 | 4/1993 | |
| WO | 1998/013538 | A1 | 4/1998 | |
| WO | WO-2011111717 | A1 | 9/2011 | |
| WO | 2011131959 | A1 | 10/2011 | |
| WO | 2011142838 | A2 | 11/2011 | |
| WO | 2013131838 | A1 | 9/2013 | |
| WO | 2014081235 | A1 | 5/2014 | |
| WO | 2014204985 | A1 | 12/2014 | |
| WO | 2015048550 | A1 | 4/2015 | |
| WO | 2015148357 | A1 | 10/2015 | |
| WO | 2016144909 | A1 | 9/2016 | |
| WO | 2017174098 | A1 | 10/2017 | |
| WO | 2018152436 | A1 | 8/2018 | |
| WO | 2018231926 | A1 | 12/2018 | |
| WO | 2019240933 | A1 | 12/2019 | |
| WO | 2020035138 | A1 | 2/2020 | |
| WO | WO-2020035549 | A2 | 2/2020 | |
| WO | 2020201405 | A1 | 10/2020 | |

OTHER PUBLICATIONS

Written Opinion from corresponding PCT Application No. PCT/EP2020/083958 dated Sep. 7, 2021.

International Search Report from corresponding PCT Application No. PCT/EP2021/085110 dated Jul. 13, 2022.

Written Opinion from corresponding PCT Application No. PCT/EP2021/085110 dated Jul. 13, 2022.

Wang, Y., et al., "One-step electrodeposition of polyaniline/nickel hexacyanoferrate/sulfonated carbon nanotubes interconnected composite films for supercapacitor," J. Solid State Electrochem, 19: 3157-3168 (2015).

Chalamala, B.R., et al., "Redox Flow Batteries: An Engineering Perspective," Proceedings of the IEEE, 102(6): 976-999 (2014).

International Search Report from PCT Application No. PCT/EP2021/062040 dated Feb. 9, 2022.

Written Opinion from PCT Application No. PCT/EP2021/062040 dated Feb. 9, 2022.

Viault, G., et al. (2011). Synthesis of a Focused Chemical Library Based on Derivatives of Embelin, a Natural Product with Proapoptotic and Anticancer Properties. Eur. J. Org. Chem., 2011(7): 1233-1241.

Nagase, Y., et al. (1954). Oxidation of Naphthols with Hydrogen Peroxide in Alkaline Media. Journal of the Pharmaceutical Society of Japan, 74(1): 9-13.

Ettel, V., et al. (1956). Oxidation of pyrocatechol. II. Oxidation in alkaline solution. Chemicke Listy Pro Vedu a Prumysl, Praha, Czechia, 51: 1153-1158.

Xiao, B., et al. (2008). Syntheses and structural characteristics of copper(II)-organic polymers based on N-heterocyclic ligands: A study on the importance of steric factors in the design of potent catalysts. Journal of Molecular Catalysis, 288(1-2): 42-51.

International Search Report from corresponding PCT Application No. PCT/EP2021/087647 dated Apr. 11, 2022.

(56) References Cited

OTHER PUBLICATIONS

Written Opinion from corresponding PCT Application No. PCT/EP2021/087647 dated Apr. 11, 2022.
Sanchez-Diez, E., et al., "Redox flow batteries: Status and perspective towards sustainable stationary energy storage," Journal of Power Sources, 481: 1-23 (2020).
Zhou, M., et al., "Single-Molecule Redox-Targeting Reactions for a pH-Neutral Aqueous Organic Redox Flow Battery," Angew. Chem. Int. Ed., 59: 14286-14291 (2020).
Charalambous, et al. (1977). Deoxygenation of 2-Nitrosophenols and of their Metal Complexes with Triphenyphosphine. Sytnthesis of Phenzaines, Dihydrophenazines, Triphenyl(o-hydroxyphenylimino)phosphoranes and their Metal Complexes, Journal of the Chemical Society, 400-401.
Gao Xiaochun et al. (2013). Synthesis and anti cancer activity of some novel 2-phenazinamine derivatives, European Journal of Medicinal Chemistry, 69: 1-9.
Laha J.K., et al. (2014). Transition-Metal-Free Tandem Oxidative Removal of Benzylic Methylene Group by C—C and C—N Bond Cleavage Follwed by Intramolecular New Aryl C—N Bond Formation under Radical Conditions, Org. Lett. 17: 4392-4395.
Salomi B.S: et al. (2007). Electrochemical studies of horseradish peroxidase covalently coupled with redox dyes, Biosensors • nd Bioelectronics, 22(8): 1825-1829.
Tabor, Daniel P (2018). Approaching saturation limits, Nature Energy, 3:455-456.
Maiers, W.A. et al. (1959). The reaction of phenazine with free benzyl radicals, J_ Chem. Soc., 2085-2087.
V'oshioka 1., et al. (1964). Studies on Phenazines. XXV. On the Bromination of 1- and 2-Methylphenazine by N-Bromosuccinimide. (1), Chem Pharm Bull (Tokyo).
Lange, A et al. (1981). The Electronic Spectra of Aminophenazines, Ber.Bunsenges.Phys.Chem. 85: 78-85.
Nagai, K et al. (1991). DNA Cleavage by Oxygen Radicals Produced in the Absence of Metal lons or Light, J. Am. Chem. Soc., 113: 5099-5100.
Martin, D.A. et al. (2017). White light induced colvalent modification of graphene using a phenazine dye, Chem. Commun. 53:10715-10718.
Zamaratski, E. et al. (1998). Synthesis of Phenazine-tethered Arabino and Zylofuranosyl Oligonucleotide Conjugates: The Thermal Stability and Flourescence Properties of Their Duplexes (DNA-DNA & DNA-RNA) & Triplets, Tetrahedron 54: 8183-8206.
Dilung, I.I. et al. (1984). Scientific selection of photopolymerization initiators for information recording, Visnik Akademii Nauk Ukrains'koi RSR, 12:15-23.
Non-Final Office Action from U.S. Appl. No. 17/799,879 dated Jan. 31, 2025.
Final Office Action from U.S. Appl. No. 17/799,879 dated May 19, 2025.
Arai, G., and Onozuka, M., "The Reaction of 1, 4-Naphthoquinone-2-sulfonate with Sodium Sulfite," The Chemical Society of Japan, 12: 1899-1903, (1981).
Azarov, V.I., "Khimiya drevesiny i sinteticheskikh polimerov," Sankt-Petersburg, pp. 366-373 (1999).
Brauns, F.E., "Khimiya lignina," Moscow, pp. 558-570 (1964).
Denisov, E.T., and Metelitsa, D.I., "Oxidation of Benzene," Russ. Chem. Rev., 37 (656), 1968.
Dominguez-Ramos, A., et al., "Electrochemical Oxidation of Lignosulfonate: Total Organic Carbon Oxidation Kinetics," Ind. Eng. Chem. Res., 47(24): 9848-9853 (2008).
Dorn, Bv H. W., et al., "Certain Derivatives of the Ethers of Hydroxyhydroquinone," Journal of the American Chemical Society, 61: 144-147 (1939).
Duval, A., et al., "Fractionation of lignosulfonates: comparison of ultrafiltration and ethanol solubility to obtain a set of fractions with distinct properties," Holzforschung, 69(2): 127-134 (2015).
Fitzky, H.G., et al., "Paramagnetic electron resonance measurements fo short-lived, substituted p-benzosemiquinones," Photographische Korrespondenz, 103(4): 60-64 (1967).
Gierer, J., "Chemistry of delignification, Part 1: General concept and reactions during pulping," Wood Science and Technology, 19: 289-312 (1985).
Gierer, J., "Chemistry of delignification: Part 2: Reactions of lignins during bleaching," Wood Science and Technology, 20: 1-33 (1986).
Hu L., et al., "Methods to Improve Lignin's Reactivity as a Phenol Substitute and as Replacement for Other Phenolic Compounds: A Brief Review," Bio Resources, 6(3): 3515-3525 (2011).
Huber, G. W., et al., "Synthesis of Transportation Fuels from Biomass: Chemistry, Catalysts, and Engineering," Chemical Reviews, American Chemical Society, 106: 4044-4098 (2006).
International Search Report from PCT Application No. PCT/EP2018/053595 dated Jun. 12, 2018.
International Search Report from PCT Application No. PCT/EP2018/053596 dated May 3, 2018.
International Search Report from PCT Application No. PCT/EP2018/053597 dated May 8, 2018.
International Search Report from PCT Application No. PCT/EP2019/053602 dated Apr. 3, 2019.
International Search Report issued in PCT/EP2017/000461 dated Dec. 6, 2017.
International Search Report issued in PCT/EP2017/000462 issued Sep. 6, 2017.
Mark, H. B., and Atkin, C. L., "Electrode Reactions of Aromatica Compounds in Strong Acid Solutions," Analytical Chemistry, 36(3): 514-520 (1964).
Miyazawa, T., et al., "Highly regioselective propanoylation of dihydroxybenzenes mediated by Candida antarctica lipase B in organic solvents," Tetrahedron Letters, 49: 175-178 (2008).
Moodley, B. et al., "The electro-oxidation of lignin in Sappi Saiccor dissolving pulp mill effluent," 37(1): 33-40 (2011).
Office Action dated Mar. 20, 2020 issued in U.S. Appl. No. 16/091,436.
Kamm, Birgit et al. "International biorefinery systems", Pure & Applied Chemistry, 79(11): 1983-1997, XP93023254 (2007).
Kim Sungjin et al. "Synthesis of 2,5-Diaminoquinones by One-Pot Copper-Catalyzed Aerobic Oxidation of Hydroquinones and Addition Reaction of Amines", Advanced Synthesis and Catalysis, 351(16):2573-2578, XP93023976 (2009).
Lange, Jean-Paul et al. "Lignocellulose conversion: an introduction to chemistry process and economics", Biofuels, Bioproducts & Biorefining, 1(1):39-48, XP93023325 (2007).
McCarthy, Joseph et al. "Lignin Chemistry, Technology, and Utilization: A Brief History" In: Chemistry, Process Design, and Safety for the Nitration Industry /ACS /Symposium Series, American Chemical Society/Oxford University Press, US, 1-99, XP93023322 (1999).
Ochoa-Gomez, Jose et al. "Industria Quimica Basada en Biomasa implicaciones tecnologicas", 1-106, XP93023315 (2007).
Qi Song et al. "Hydrogenolysis of lignosulfonate into phenols over heterogeneous nickel. catalysts", Chemical Communications, 48(56): 7019-7021, XP055157001 (2012).
Shao, Dan et al. "Electrochemical oxidation of lignin by two typical electrodes: Ti/Sb—SnO2 and Ti/PbO2", Chemical Engeneering Journal, 244:288-295, XP93023751 (2014).
Tarasov, Dmitry et al. "Production of Lignosulfonate in NSSC-Based Biorefinery", Biotechnology Progress, 31(6):1508-1514, XP093023239 (2015).
CAS Registry No. 783281-80-1; 2-Naphthalenesulfonic acid, 1,4-dihydro-3-methoxy-1,4-dioxo-, (2004).
CAS Registry No. 745756-46-1; 2,7-Naphthalenedisulfonic acid, 1,4-dihydro-3-(1-methylethoxy)-1,4-dioxo-, (2004).
Chemical Abstracts Accession No. 2012:1705525 (CAPlus), (2012).
Chemical Abstracts Accession No. 1964:468988 (CAPlus), (1964).
Chemical Abstracts Accession No. 1963:66335 (CAPlus); (1962).
Examination Report from corresponding Australian Application No. 2017246493 dated May 3, 2023.
Notice of Allowance issued in corresponding U.S. Appl. No. 17/177,567 dated Sep. 21, 2022.
Huskinson et al., "A metal-free organic-inorganic aqueous flow battery," Nature, 505(7482):195-198 (2014).
Non-Final Office Action from U.S. Appl. No. 17/842,079 dated Nov. 24, 2023.

(56) References Cited

OTHER PUBLICATIONS

Non-Final Office Action from U.S. Appl. No. 18/197,415 dated Feb. 14, 2024.
Office Action from corresponding CA Appln. No. 3,017,989 dated Jun. 7, 2024.
Non-Final Office Action from U.S. Appl. No. 18/611,202 dated Sep. 29, 2024.
Bidman, T.A. (2004). Oxidation of 2-alkyl-5,10-dihydrophenazines. Russ J Gen Chem 74: 1433-1434.
Wei, et al., (2016). A turn-on fluorescent chemosensor selectively detects cyanide in pure water and food sample, Tetrahedron letters, 57:2767-2771.
European Search Report received in corresponding European Patent Application No. 19 758 645.6 dated Aug. 28, 2023.
Goulet, M., et al. (2019). Extending the Lifetime of Organic Flow Batteries via Redox State Management, Journal of the Americal Chemical Society, 141:8014-8019.
International Search Report and Written Opinion received for International Application No. PCT/EP2020/083927 mailed on Aug. 2, 2021.
Hollas, et al., (2018). A biometrick high-capacity phenazine-based anolyte for acqueous organic redox fllow batteries, Nature Energy, 3: (6): 508-514.
Ninsberg et al. (2016). TEMPO/Phenazine Combi-Molecule: A redox-active material for symmetric acqueous redox- flow batteries, ACS Energy Letters, 1(5): 976-980.
Intemational Search Report and Written Opinion received for International Application No. PCT/EP2021/054296 mailed on Mar. 16, 2021.
Non-Final Office Action from U.S. Appl. No. 17/799,877 dated Jul. 16, 2025.
Non-Final Office Action from U.S. Appl. No. 18/031,751 dated Dec. 5, 2025.
Office Action from Japanese Application No. 2023-535447 dated Jan. 9, 2026.
Office Action from JP Application No. 2023-529953 dated Dec. 12, 2025.
Examination Report from Indian Application No. 202217043089 dated Nov. 13, 2025.
Office Action from corresponding Eurasian Patent Application No. 201892234 dated Sep. 10, 2019.
Office Action from corresponding Japanese Application No. 2019-503619 dated Feb. 8, 2022.
Office Action from corresponding U.S. Appl. No. 16/480,956 dated Aug. 17, 2021.
Office Action from corresponding U.S. Appl. No. 16/480,958 dated Aug. 23, 2021.
Restriction Requirement from U.S. Appl. No. 16/091,437 dated Jun. 15, 2020.
Smook, Gary A., "Handbook for Pulp and Paper Technologists," Angus Wilde Publications, 2nd edition, chapters 7 and 8 (1992).
Vandenberghe A., and Willems J.F., "Sulphonation of Alkylhydroquinones," Bull. Soc. Chim. Belges, 74(9-10): 397-406 (1965).
Weatherbee, C., et al., "A New Approach to Tertiary b-Chloroalkylamines. Synthesis of b-Chloroalkylaminomethylhydroquinones1", Journal of Organic Chemistry, 21(10): 1138-1141 (1956).
Wedege, K., et al., "Organic Redox Species in Aqueous Flow Batteries: Redox Potentials, Chemical Stabilitiy and Solubility," Scientific Reports, 6(1): 1-13 (2016).
Weetall, H. H., et al., "Biotechnology and Bioengineering—A Direct Fuel Cell for the Production of Electricity from Lignin," vol. 27, No. 7, p. 1-11 (1985).
Written Opinion from PCT Application No. PCT/EP2018/053595 dated Jun. 12, 2018.
Written Opinion from PCT Application No. PCT/EP2018/053596 dated May 3, 2018.
Written Opinion from PCT Application No. PCT/EP2018/053597 dated May 8, 2018.
Written Opinion from PCT Application No. PCT/EP2019/053602 dated Apr. 3, 2019.
Written Opinion issued in PCT/EP2017/000461 issued Dec. 6, 2017.
Written Opinion issued in PCT/EP2017/00462 issued on Sep. 6, 2017.
www.chem.uiuc.edu, "Oxidation of Phenols," (1999).
Xu, Ch. et al., "Lignin depolymerisation strategies: towards valuable chemicals and fuels," Chem Soc Rev. 43: 7485-7500 (2014).
Yang, B., et al., "An Inexpensive Aqueous Flow Battery for Large-Scale Electrical Energy Storage Based on Water-Soluble Organci Redox Couples," Journal of the Electrochemical Society, 161(9): A1371-A1380 (2014).
Zakzeski, J. et al., "The Catalytic Valorization of Lignin for the Production of Renewable Chemicals," Chem. Rev., 110: 3552-3599 (2010).
Zhang, S., et al., "An Organic Electroactive Material for Flow Batteries," Electrochimica Acta, 190: 737-743 (2016).
Zhou, Y. et al., "Methods to Improve Lignin's Reactivity as a Phenol Substitute and as Replacement for Other Phenolic Compounds: A Brief Review," BioResources, 6(3): 1-11 (2011).
Office Action from corresponding U.S. Appl. No. 16/480,958 dated Apr. 26, 2022.
Office Action from corresponding U.S. Appl. No. 16/484,301 dated Apr. 22, 2022.
Kaiho, A et al., "Construction of the di(trimethylolpropane) cross linkage and the phenylnaphthalene structure coupled with selective ?- O-4 bond cleavage for synthesizing lignin-based epoxy resins with a controlled glass transition temperature," Green Chem., 18: 6526-6535 (2016).
Klein, I et al., "Lignin depolymerization over Ni/C catalyst in methanol, a continuation: effect of substrate and catalyst loading," Catal. Sci. Technol., 5: 3242-3245 (2015).
Office Action issued in corresponding U.S. Appl. No. 16/480,958 dated Feb. 4, 2022.
Office Action issued in corresponding U.S. Appl. No. 16/480,958 dated Sep. 14, 2022.
Restriction Requirement issued in corresponding U.S. Appl. No. 16/484,301 dated Sep. 29, 2021.
Office Action issued in corresponding U.S. Appl. No. 16/484,301 dated Oct. 27, 2022.
Restriction Requirement issued in U.S. Appl. No. 16/968,732 dated Mar. 17, 2022.
Office Action issued in U.S. Appl. No. 16/968,732 dated Jun. 24, 2022.
Office Action issued in U.S. Appl. No. 16/968,732 dated Nov. 30, 2022.
Restriction Requirement issued in corresponding U.S. Appl. No. 16/480,956 dated Apr. 28, 2021.
Restriction Requirement issued in corresponding U.S. Appl. No. 16/091,436 dated Aug. 1, 2019.
Interview Summary issued in corresponding U.S. Appl. No. 16/091,436 dated Jun. 4, 2020.
Office Action issued in corresponding U.S. Appl. No. 16/091,437 dated Nov. 25, 2020.
Office Action issued in corresponding U.S. Appl. No. 16/091,437 dated May 4, 2021.
Yang et al., "High-Performance Aqueous Organic Flow Battery with Quinone-Based Redox Couples at Both Electrodes", Journal of The Electrochemical Society 163(7):A1442-A1449 (2016).
Search Report issued in corresponding EP Appln. No. EP22173705.9 dated Oct. 28, 2022.
Office Action issued in corresponding U.S. Appl. No. 16/967,898 dated Dec. 6, 2022.
Office Action issued in corresponding JP Appln. No. 2021-142062 dated Mar. 16, 2023.
Search Report issued in corresponding EP Appln. No. 22203539.6 dated Mar. 15, 2023.
Search Report issued in corresponding EP Appln. No. 22203648.5 dated Mar. 17, 2023.
Chowdhury Pankaj et al., "Aqueous Photoelectrochemical Reduction of Anthraquinone Disulfonate at Organic Polymer Films", Macromolecular Chemistry and Physics, 217(10):1119-1127 (2016).

(56) References Cited

OTHER PUBLICATIONS

Corby B. W. et al., “Clean-chemistry sulfonation of aromatics”, J. Chem. Research (S), 26-327 (2002).
Abraham, Ignatious et al. “Recent Advances in 1,4-Benzoquinone Chemistry”, Journal of the Brazilian Chemical Society, 22(3):385-421, XP93023984 (2011).
Cheng, Yu-Ting et al. “Production of targeted aromatics by using Diels-Alder classes of reactions with furans and olefins over ZSM-5”, Green Chemistry, 14(11):3114-3125, XP055068442 (2012).
Gosselink, Richard et al. “Lignin as a renewable aromatic resource for the chemical industry (Thesis)”, 1-196, XP93023331 (2011).
Iskhakova, Gulnara et al. “Diels-Alder reaction between naphthalene and N-phenylmaleimide under ambient and high pressure conditions”, 1-10, XP93023886 (2005).
Pillay, Devina et al. (2007). A First Principles Study of the Effects of Sulfur Adsorption on the Activity of Pt, Ni and Pt3Ni. The 2007 Annual Meeting, Salt Lake City.
Zhang et al. (2017). Influence of silica-alumina support ratio on H2 production and catalyst carbon deposition from the Ni-catalytic pyrolysis/ reforming of waste tyres. Waste Management and Research, 35(10): 1-45-1054.
Non-Final Office Action from U.S. Appl. No. 18/036,558 dated Mar. 17, 2026.
Non-Final Office Action from U.S. Appl. No. 18/657,949 dated May 12, 2026.
Restriction and Election of Species Requirement from U.S. Appl. No. 18/038,820 dated May 8, 2026.
Pan, F. et al. (2014). Redox Targeting of Anatase TiO2 for Redox Flow Lithium-Ion Batteries. Adv. Energy Mater., 4: 1400567.
Yan, R. et al. (2018). Redox-Targeting-Based Flow Batteries for Large-Scale Energy Storage. Adv. Mater. 30: 1802406.
Non-Final Office Action from U.S. Appl. No. 18/289,595 dated Apr. 23, 2026.

* cited by examiner

ELECTROLYTE REGENERATION FOR REDOX FLOW BATTERIES BASED ON FERROCYANIDE AND/OR FERRICYANIDE SALTS

PRIORITY STATEMENT

This application is a national stage application under 35 U.S.C. § 371 of PCT International Application No. PCT/EP2020/083958, which has an international filing date of 30 Nov. 2020. The content of this applications recited above is incorporated herein by reference in their entirety.

FIELD

The present invention relates to a process for the regeneration of an aqueous electrolyte solution of a redox-flow battery containing at least one inorganic redox active compound (e.g. a ferrocyanide and/or ferricyanide salt) as redox-active material.

BACKGROUND

Progressive depletion of fossil fuels reserves and concerns resulting from its environmental consequences as the main energy sources have led to an increasing prominence of renewable-energy systems (e.g., solar- and wind-based systems). The intermittent nature of renewable energy sources however makes it difficult to fully integrate these energy sources into electrical grids, resulting in the danger of power outages or negative power prices (B. Dunn, H. Kamath, J.-M. Tarascon, *Science* 2011, 334, 928-935; www.cleanenergywire.org/factsheets/why-power-prices-turn-negative, accessed on Sep. 8, 2019). A solution to this problem are large-scale energy storage systems (EES), which are vital for distributed power generation development and grid stabilization. One of the most promising technologies in this field are redox-flow batteries (RFBs), first developed by NASA during the 1970's. RFBs are electrochemical systems that can repeatedly store and convert electrical energy to chemical energy and vice versa when needed. Redox reactions (characterized by individual electrolyte compounds in each half-cell) are employed to store energy in the form of a chemical potential in liquid electrolyte solutions, which are pumped through electrochemical cells.

One of the major challenges of batteries besides the price is the ecological footprint that the battery leaves behind (A. Regett, W. Mauch, U. Wagner, Carbon footprint of electric vehicles—a plea for more objectivity, *FFE* 2018). In the pursuit of a more eco-friendly and sustainable power production leading countries often do not take the ecological consequences into account that are affiliated with the battery production. A rising problem are the ramification of cobalt and lithium mining which are necessary for the growing demand of lithium batteries (www.wired.co.uk/article/lithium-batteries-environment-impact). One of the most obvious solutions to reduce the ecological footprint and reduce the price is the recycling of used batteries to reuse the active materials (X. Zhang, L. Li, E. Fan, Q. Xue, Y. Bian, F. Wu, R. Chen, *Chem Soc. Rev.* 2018, 47, 7239-7302). Although this seems to be one of the first options the task is challenging for conventional batteries with solid active material, such as NiCd, NiMH or Li-Ion batteries (A. M. Bernardes, D. C. R. Espinosa, J. A. S. Tenério, *Journal of Power Sources* 2004, 130, 291-298; T. Georgi-Maschler, B. Friedrich, R. Weyhe, H. Heegn, M. Rutz, *Journal of Power Sources* 2012, 207, 173-182; S. Natarajan, V. Aravindan, *ACS Energy Lett.* 2018, 3, 2101-2103). The battery components are hard to separate, volatile and toxic electrolytes evaporate during the process and the active material such as lithium reacts quickly under air and can even combust. The rate of recovery is comparable low, or the material cannot be reused in batteries again. In comparison to conventional batteries, Redox-Flow-Batteries have a major advantage for the recyclability due to their basic setup. For the RFB the posolyte and negolyte are separated from the power unit where the electrochemical reaction takes place and stored in individual tanks. Each electrolyte can be individually accessed directly without disassembly of the battery. The negolyte or posolyte can be exchanged or treated during maintenance or even while the battery is still under operation. However, so far, the only example for the treatment of deactivated organic electrolytes is the oxidation by oxygen of an anthraquinone degradation product outside the system that became inactive upon its dimerization (M.-A. Goulet, L. Tong, D. A. Pollack, D. P. Tabor, S. A. Odom, A. Aspuru-Guzik, E. E. Kwan, R. G. Gordon, M Aziz, *J. Am. Chem. Soc.* 2019, 141, 8014-8019). By oxidation, an intermediate is oxidized yielding the anthraquinone.

Typically, the active material is dissolved in water or an organic solvent. The degradation that occurs over time and leads to capacity fading of the battery is a change of the active material that either leads to a change in solubility, in cell potential and/or to a loss of activity as a redox active substance. The material can either change its electrochemical performance and stay in solution or precipitate and therefore become unavailable for the RFB. Potentially, recycling or treatment of the degraded material could increase the longevity of the battery, decrease the ecological impact and increase the economic benefit of these battery systems.

SUMMARY

It is an object of the present invention to provide for a process for recycling redox-active material from an RFB in order to restore the electrochemical performance and or capacity.

Such a recycling process involves at least one of the following partial processes:

i) Chemical or electrochemical treatment of altered or inactive soluble material that stays in solution during the operation of the RFB with the aim to improve the performance and/or to reactivate the material as redox-active compounds for electrical energy storage;

ii) Removal of precipitated altered or inactive material from the battery system and subsequent modification with the aim to improve the solubility and/or to reactivate the material as redox-active compounds for electrical energy storage; and iii) Separation of electrolyte compounds, which have migrated to the electrolyte solution of the other half-cell, e.g. due to operation conditions or loss of function of the semipermeable membrane, within the battery system.

BRIEF DESCRIPTION OF THE DRAWINGS

In FIG. 3 the positions for filtration in the main piping system of the battery or in an auxiliary piping system that is not connected to the power unit are shown.

DETAILED DESCRIPTION

Figure 1:
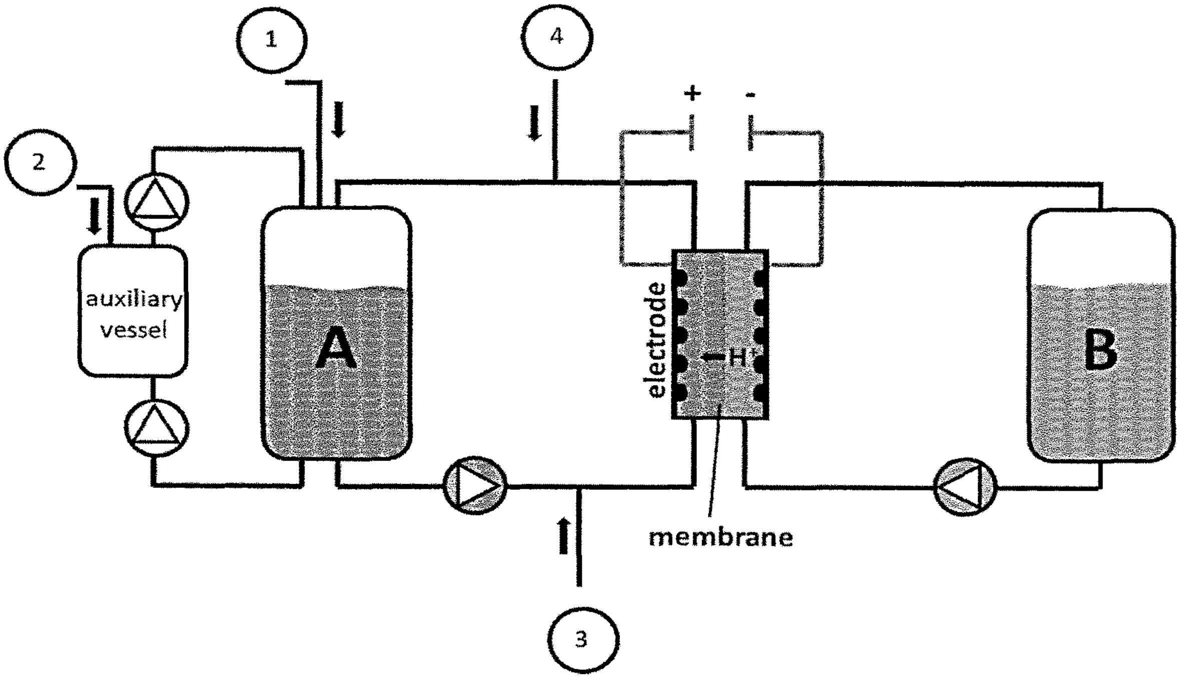
FIG. 1 is a depiction of an example redox flow battery (RFB) where A is a tank containing posolyte, B is a tank containing negolyte. The power unit and the pumps are not shown. The regeneration of altered electrolyte material in solution can be done by treatment at various points of the RFB.

Both organic or inorganic electrolytes for RFBs are subject to structural modification over time and oxidation/reduction battery cycles. The electrolytes' half-life and their degradation pathway depend on the material. In any case, the capacity of the battery decreases as a function of time. The degradation or structural modification can be caused by external factors, such as oxygen or light or, in particular, by internal factors, such as electrochemical reactions during charging and discharging, intramolecular chemical reactions, intramolecular reactions with the solvent or with other molecules or the interaction with the battery components. Essentially, the modified electrolyte compounds may stay in solution and lose their activity or performance, or they may precipitate such that they are excluded from involvement in redox reactions of charging and discharging.

As far as soluble compounds are concerned; their recycling may either take place in the battery itself by treatment of the solution within the (operating) battery system or by treatment outside of the (operating) battery system. In case of the treatment within the system, compatibility of the applied recycling process with the battery equipment needs to be ensured. For the external treatment, the modified or inactive compounds may either be isolated from the electrolyte solution or be treated in solution.

Precipitated compounds may be isolated in various ways. Filters may be implemented within the battery hydraulic systems to filter off the precipitated material from the battery's electrolyte solutions. Alternatively, an external filter may be foreseen on the tank that is operated continuously or an (mobile) external filter, which is e.g. operated during regular intervals or maintenance. The filtration/separation step may be carried out by a filter press, centrifuge or by membrane filtration. The isolated material may thus be removed from the system and treated in an external vessel.

Another issue having an impact on the battery's capacity is the migration of redox-active electrolyte compounds from their respective half-cell to the other half-cell of the battery, e.g. via the membrane separating the two half-cells. Thereby, the capacity and/or performance in the battery decreases due to loss of difference in potential between the two half-cells. Such migration of redox-active compounds may also result from damaged equipment or an operation failure. Spilled electrolyte can be taken up and mixed electrolyte in the battery needs to be treated in a vessel. The electrolyte compounds of the two half-cells may be physically and/or chemically separated. Upon separation, the restored redox-active electrolyte compounds may be reintroduced into the respective half-cells as posolyte and negolyte in the battery.

The present invention provides a process for the regeneration of an aqueous electrolyte solution of a redox-flow battery containing at least one inorganic redox active compound, said process comprising at least one of the following steps (a), (b) and/or (c):

(a) treatment of the electrolyte solution in order reduce the at least one inorganic redox active compound to the reduced state;
(b) removal of precipitated material from the electrolyte solution and subsequent modification of the precipitated material to obtain at least one water soluble inorganic redox active compound; and/or
(c) separation of inorganic redox active compounds from redox active compounds other than the at least one inorganic redox active compound.

According to a preferred embodiment, the inorganic redox active compound is selected from compounds including transition metal ions and/or halogen ions, such as $VCl_3/VCl_2$, $Br/ClBr_2$, $Cl_2/Cl^-$, $Fe^{2+}/Fe^{3+}$, $Cr^{3+}/Cr^{2+}$, $Ti^{3+}/Ti^{2+}$, $V^{3+}/V^{2+}$, $Zn/Zn^{2+}$, $Br_2/Br^-$, $Br_2/I^-$, $VBr_3/VBr_2$, $Ce^{3+}/Ce^{4+}$, $Mn^{2+}/Mn^{3+}$, $Ti^{3+}/Ti^{4+}$, $Cu/Cu^+$ and/or $Cu^+/Cu^{2+}$ based compounds. According to a preferred embodiment, metal ions are complexed by ligands.

According to a further preferred embodiment, the at least one inorganic redox active compound is selected from $M_3[Fe(CN)_6]$ and $M_4[Fe(CN)_6]$ (especially preferably, the at least one inorganic redox active compound is a mixture thereof), wherein M is a cation such as e.g. sodium, potassium or ammonium or mixtures thereof.

Ferrocyanide may preferably be used as a posolyte for an RFB. In particular, a ferrocyanide salt may exhibit a variety of counterions, such as sodium, potassium or ammonium. For example, potassium/sodium ferrocyanide may be used. The ferrocyanide is the reduced and the ferricyanide the oxidized form representing the discharged and charged state, respectively. Under normal conditions, the posolyte is charged and discharged under releasing or taking up an electron in the same amount as the negolyte. Under certain circumstances this equilibrium is changed, e.g. due to oxidation of the charged negolyte, overreduction of the negolyte during charging or degradation of the posolyte or negolyte. In most cases these factors lead to a higher demand for electrochemical reduction and thus more ferrocyanide is needed. After some time in a symmetric system the posolyte cannot be completely discharged (reduced) and the negolyte cannot be completely charged (reduced) during a battery cycle. The addition of more ferrocyanide or using an excess of ferrocyanide during operation change the electrochemical potential and increases the required volume of the posolyte and therefor is not commercially feasible. A more feasible approach is the addition of a reducing agent, such as sodium sulphite, dithionite, sodium formate or formic acid, directly to the solution that can be metered, does not significantly increase the volume or change the electrochemical potential. The reduction reaction can either be done with a fast reacting reducing agent during a maintenance or a slow reacting reducing agent which is continuously added in small portions to the electrolyte solution.

Preferably, in step (a) reducing the at least one inorganic redox active compound is carried out using a reducing agent, such as sodium sulfite, potassium sulfite, sodium dithionite, sodium formate, formic acid and/or ascorbic acid.

Further preferably, in step (a) reducing the at least one inorganic redox active compound is carried out by electrical treatment.

In step (b) the precipitated material is preferably removed from the electrolyte solution by filtration or centrifugation (by a centrifuge); more preferably by filtration. Filtration may e.g. be carried out by a filter press, a bag filter or a membrane filter.

Further preferably, in step (b) the subsequent modification of the precipitated material involves treatment of the precipitate with a cyanide such as KCN and/or NaCN. The resulting product may then optionally be further treated with a reducing agent, such as but not limited to sodium sulfite, potassium sulfite, or sodium dithionite, formic acid, ascorbic acid, or sodium formate.

During cyclisation in redox-flow batteries (RFB) over an extended period of time, electrolytes of each half-cells may cross the semipermeable membrane separating both half-cells such that the initially pure electrolyte solutions of each half-cell are increasingly contaminated by the electrolyte of the respective other half-cell solution, thus decreasing the difference of the redox potential between the half-cells causing a decrease in the capacity of the RFB and eventually loss of functionality. That phenomenon may even be accelerated by whatever damage to the membrane or an accident that destroys part of the system or the tanks or operation failure such that both electrolyte solutions contain both, the positive electrolyte (posolyte) and the negative electrolyte (negolyte). Electrolytes from such mixtures are regenerated by step (c) of the inventive process.

Recovery of the electrolytes from such mixtures and their reuse is desirable for an economic and eco-friendly operation of RFBs, since it avoids the disposal of the electrolyte mixture and the production of new electrolytes.

Preferably, in step (c) the compounds other than the at least one inorganic redox active compound (e.g. (substituted) phenazine compounds) are separated from the electrolyte solution by decreasing the pH value of the solution. Further preferably, the pH value is decreased to a pH of 7 or lower; preferably to 3.5 or lower. More preferably, the pH value is decreased using inorganic or organic acids.

According to a preferred embodiment, the process of the present invention comprises at least two of steps (a), (b) and/or (c), in particular (a) and (b). According to a further preferred embodiment, the process of the present invention comprises all three steps (a), (b) and (c).

Although the present invention is described in detail herein, it is to be understood that this invention is not limited to the particular methodologies, protocols and reagents described herein as these may vary. It is also to be understood that the terminology used herein is not intended to limit the scope of the present invention which will be limited only by the appended claims. Unless defined otherwise, all technical and scientific terms used herein have the same meanings as commonly understood by one of ordinary skill in the art.

Throughout this specification and the claims which follow, unless the context requires otherwise, the term "comprise", and variations such as "comprises" and "comprising", will be understood to imply the inclusion of a stated member, integer or step but not the exclusion of any other non-stated member, integer or step. The term "consist of" is a particular embodiment of the term "comprise", wherein any other non-stated member, integer or step is excluded. In the context of the present invention, the term "comprise" encompasses the term "consist of". The term "comprising" thus encompasses "including" as well as "consisting" e.g., a composition "comprising" X may consist exclusively of X or may include something additional e.g., X+Y.

The terms "a" and "an" and "the" and similar reference used in the context of describing the invention (especially in the context of the claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. No language in the specification should be construed as indicating any non-claimed element essential to the practice of the invention.

The word "substantially" does not exclude "completely" e.g., a composition which is "substantially free" from Y may be completely free from Y. Where necessary, the word "substantially" may be omitted from the definition of the invention.

The term "about" in relation to a numerical value x means x±10%.

As used herein, the term "negolyte" or "anolyte" refers to the electrolyte, which is in contact with the negative electrode (half-cell B) and the term "posolyte" or "catholyte" refers to the electrolyte, which is in contact with the positive electrode (half-cell A).

Preferably, the term "redox active" refers to the capability of a compound (or a composition comprising the same) to participate in a redox reaction. Such "redox active" compounds typically have energetically accessible levels that allow redox reactions to alter their charge state, whereby electrons are either removed (oxidation—yielding an oxidized form of the compound) from atoms of the compound being oxidized or transferred to the compound being reduced (reduction—yielding a reduced from of the compound). A "redox active" compound may thus be understood as a chemical compound, which may form a pair of an oxidizing and a reducing agent, i.e. a redox pair. Examples for redox active compounds are organic compounds, e.g. (substituted) phenazine compounds or inorganic electrolytes, which include transition metal ions and/or halogen ions, such as $VCl_3/VCl_2$, $Br^-/ClBr_2$, $Cl_2/Cl^-$, $Fe^{2+}/Fe^{3+}$, $Cr^{3+}/Cr^{2+}$, $Ti^{3+}/Ti^{2+}$, $V^{3+}/V^{2+}$, $Zn/Zn^{2+}$, $Br_2/Br^-$, $I^{3-}/I^-$, $VBr_3/VBr_2$, $Ce^{3+}/Ce^{4+}$, $Mn^{2+}/Mn^{3+}$, $Ti^{3+}/Ti^{4+}$, $Cu/Cu^+$, $Cu^+/Cu^{2+}$, and others.

The following compounds are examples of (substituted) phenazine compounds which may be used as electrolytes in a redox flow battery:

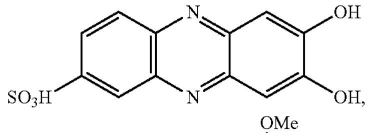

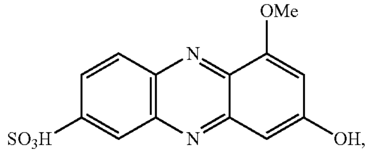

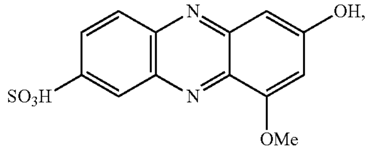

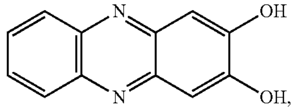

-continued

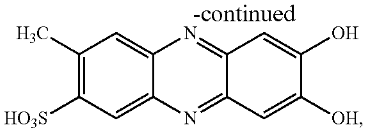,

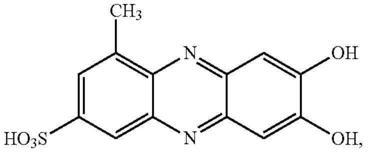,

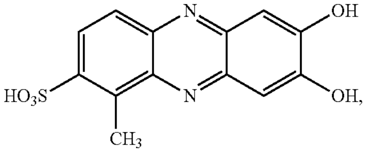,

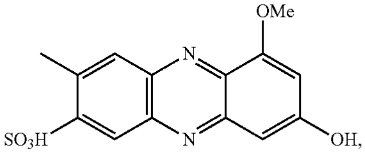, and

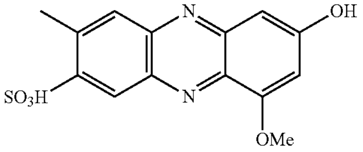

or a combination thereof.

The electrolyte solution of the process of the present invention is a redox flow battery electrolyte. A "(redox flow battery) electrolyte" refers to a substance that is capable of conducting electrical currents via electron transfer in a redox flow battery (RFB). Said redox flow battery electrolytes are typically provided as electrolyte solutions. Said "electrolyte solution" e.g. comprises at least one inorganic redox active compound as an electrolyte and water as solvent. The electrolyte solution may comprise further additives, including acids, bases, buffers, ionic liquids, stabilizers, and the like. Such an electrolyte solution containing an inorganic redox active compound is used e.g. for half-cell A of an RFB, whereas another electrolyte solution, e.g. a solution of a (substituted) phenazine compound, is used for half-cell B of the RFB.

The at least one inorganic redox active compound may be used as a posolyte (catholyte) and/or negolyte (anolyte), typically as a posolyte. The term "catholyte" refers to the part or portion of an electrolyte, which is on the cathode side of a redox-flow battery half-cell, whereas the term "anolyte" refers to the part or portion of an electrolyte, which is on the anode side of a redox-flow battery half-cell. The electrolyte of half-cell B may be another inorganic or an organic electrolyte.

The term "aqueous solvent system" or "aqueous solution" refers to a solvent system comprising preferably at least about 20% by weight of water, relative to total weight of the solvent. In some applications, soluble, miscible, or partially miscible (emulsified with surfactants or otherwise) co-solvents may also be usefully present which, for example, extend the range of water's liquidity (e.g., alcohols/glycols). In addition to the redox active electrolytes described herein, the electrolyte solutions may contain additional buffering agents, supporting electrolytes, viscosity modifiers, wetting agents, and the like, which may be part of the solvent system.

Thus, the term "aqueous solvent system" or "aqueous solution" may generally include those comprising at least about 55%, at least about 60 wt %, at least about 70 wt %, at least about 75 wt %, at least about 80%, at least about 85 wt %, at least about 90 wt %, at least about 95 wt %, or at least about 98 wt % water, relative to the total solvent. Sometimes, the aqueous solvent may consist essentially of water, and may be substantially free or entirely free of co-solvents or other (non-target compound) species. The solvent system may be at least about 90 wt %, at least about 95 wt %, or at least about 98 wt % water, or may be free of co-solvents or other (non-target compound) species.

An electrolyte solution may be characterized as having a pH of between about <0 and about >14. The pH of the electrolyte solution may be maintained by a buffer. Typical buffers include salts of phosphate, borate, carbonate, silicate, trisaminomethane (Tris), 4-(2-hydroxyethyl)-1-piperazineethanesulfonic acid (HEPES), piperazine-N,N'-bis(ethanesulfonic acid) (PIPES), and combinations thereof. A user may add an acid (e.g., HCl, $HNO_3$, $H_2SO_4$ and the like), a base (NaOH, KOH, and the like), or both to adjust the pH of a given electrolyte solution as desired.

Herein, the features of the present invention have been described. These features have also been described for specific embodiments. It should, however, be understood that they may be combined in any manner and in any number to generate additional embodiments. The variously described examples and preferred embodiments, should not be construed to limit the present invention to only explicitly described embodiments. This present description should be understood to support and encompass embodiments, which combine the explicitly described embodiments, with any number of the disclosed and/or preferred features. Furthermore, any permutations and combinations of all described features in this application shall be considered supported by the description of the present application, unless it is understood otherwise.

In the following, methods for regeneration of electrolytes in a Redox-Flow-Battery (RFB) with various setups are described. Regeneration is the physical, chemical, electrochemical or biological treatment of altered electrolytes in order to improve, solubility, stability, electrochemical potential or redoxactivity with the aim to maintain the performance of an organic RFB or increase the longevity.

Figure 2:
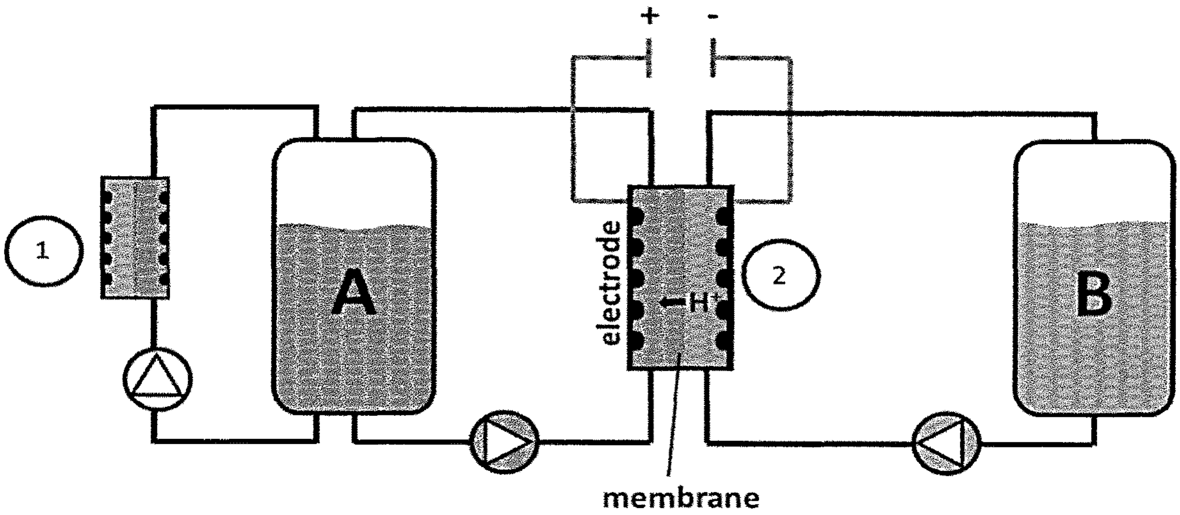
FIG. 2 is another depiction of an example redox flow battery (RFB) where A is a tank containing posolyte, B is a tank containing negolyte. The power unit and the pumps are not shown. The electrochemical regeneration of altered electrolyte material in solution can be done by treatment at various points ofthe RFB.
Figure 3:
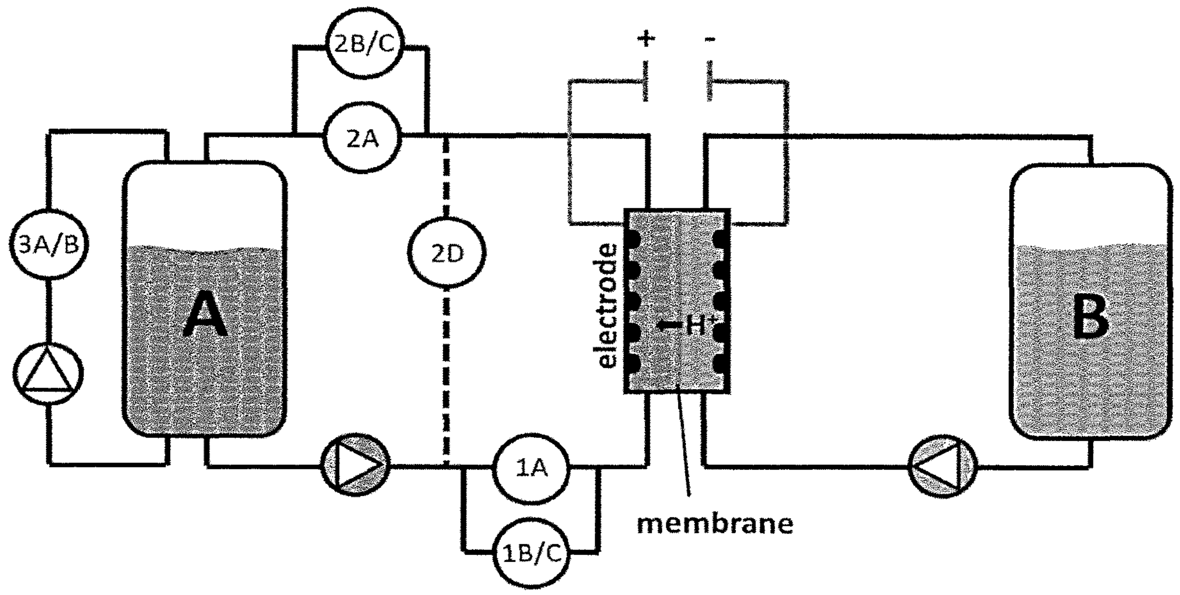
FIG. 3 is another depiction of an example redox flow battery (RFB) where A is a tank containing posolyte, B is a tank containing negolyte. The power unit and the pumps are not shown. Filtration of altered electrolyte that exceeded the solubility and precipitated can be done in various positions in the flow battery.

In FIGS. 1 to 3, A is a tank containing posolyte, B is a tank containing negolyte, C. The power unit and the pumps are not shown.

I. REGENERATION OF SOLUBLE ALTERED ELECTROLYTE

The regeneration of altered electrolyte material in solution can be done by treatment at various points of the RFB (see FIG. 1). The treatment can be done continuously optionally with in-line process control or discontinuously at maintenance or certain intervals.

a. Chemical Treatment

Chemical treatment comprises the addition of chemicals (and mixtures thereof) in solid, liquid, dissolved (e.g. as aqueous solution), suspended or gaseous form for electrolyte regeneration.

Addition of solid material: Solid material can be added as a powder, tablets or bags. The solid material can be premixed and preweighed for certain volumes, or mixed and weighed in regard of the capacity of the battery and the condition of the electrolyte prior to addition.

Addition of liquid material: Liquid material can be added by a dosing pump, canisters or other measuring devices. The liquid material can optionally be premixed and preweighed for certain volumes, or mixed and weighed in regard of the capacity of the battery and the condition of the electrolyte prior to addition.

Addition of suspensions: Suspensions can be added by a dosing pump, canisters or other measuring devices. The suspension material can optionally be premixed and preweighed for certain volumes, or mixed and weighed in regard of the capacity of the battery and the condition of the electrolyte prior to addition.

Addition of gas: Gas can be added with the help of a flow meter or flow controller, capsules or gas cylinders of a certain size. The gas can optionally be premixed and measured, or each gas individually measured and then mixed prior to addition.

b. Point of Addition (FIG. 1)

(1): In the tank. The solution in the tank is well mixed and offers easy access even for larger type of equipment. This position is suited for addition of solid, liquid or gaseous material as well as suspensions. Monitoring of the electrolyte conditions as well as process control equipment for the regeneration can be installed at this position.

(2): In an auxiliary vessel. An auxiliary vessel offers the possibility for better control of the regeneration and different conditions than in the main system. Temperature, pressure and mixing can be adjusted to the requirements for regeneration. This position is suited for addition of solid, liquid or gaseous material as well as suspensions. Process control equipment for the regeneration can be installed at this position but monitoring of the electrolyte is done at a different point.

(3): in the piping system prior to the power unit. The flow in the piping system is faster than in the tank but in most cases not turbulent. By adding the chemicals in front of the power unit the regeneration reaction can be controlled by the defined residence time within the power unit and the concentration that is higher than compared to the addition to the tank. Additionally, by addition of the chemicals in front of the power unit the reaction can be done chemically or electrochemically. This position is suited for addition liquid or gaseous material as well as suspensions. Monitoring of the electrolyte conditions as well as process control equipment for the regeneration can be installed at this position.

(4): in the piping system behind the power unit. By the addition of the chemicals behind the power unit the mixture is transported into the tank which can benefit the mixing and reduce the risk of unwanted side reactions due to locally high concentrations. Furthermore, reactive intermediates that are formed in the power unit can directly be regenerated without undergoing further alteration. This position is suited for addition liquid or gaseous material as well as suspensions. Monitoring of the electrolyte conditions as well as process control equipment for the regeneration can be installed at this position.

c. Electrochemical Treatment

Electrochemical treatment is the alteration by an electrical current optionally in the presence of other chemicals than the electrolyte. The electrochemical regeneration of altered electrolyte material in solution can be done by treatment at various points of the RFB (see FIG. 2). The treatment can be done continuously optionally with in-line process control or discontinuously at maintenance or certain intervals.

(1): In an external cell. The electrochemical regeneration in an external cell can be run at different conditions than the main power unit. The potential, current density and the redox pair can be adjusted to the required parameters for the regeneration. Process control equipment for the regeneration can be installed at this position but monitoring of the electrolyte is preferably done at a different point. The process can be run continuously, during maintenance or in certain intervals. The case of a discontinuously mode a permanently installed setup or a mobile temporary setup can be used.

(2): Additional function in the power unit. Electrochemical regeneration of the electrolyte can be done by extended conditions, such as, but not limited to, extended or reduced upper and lower potential limits, reverse of the current, or alternating current programs. These treatments can be done during maintenance or in certain intervals. Monitoring of the electrolyte conditions as well as process control equipment for the regeneration can be installed at this position.

(2): Combination with chemicals. By electrochemical regeneration in the presence of other chemicals the regeneration can be done by extended conditions in the power unit or without the necessary to change the regular mode of operation of the battery. The process can be run continuously, during maintenance or in certain intervals. Monitoring of the electrolyte conditions as well as process control equipment for the regeneration can be installed at this position.

II. FILTRATION OF PRECIPITATED MATERIAL OR SUSPENSIONS

Filtration of altered electrolyte that exceeded the solubility and precipitated can be done in various positions in the flow battery. In FIG. 3 the positions for filtration in the main piping system of the battery or in an auxiliary piping system that is not connected to the power unit are shown:

a. Main Piping System (1): In front of the power unit, behind the tank. At this point suspended material can be filtered off before entering the power unit. In case of larger or sharp particles and larger amounts of precipitation this position reduces the strain on the parts in the power unit and eliminates the risk of blocking of small inlet channels. The filtration process can be done:

1A: continuously, in the mainstream.

1B: continuously, of a certain share of the stream in a parallel setup.

1C: discontinuously, during maintenance or at certain periods by channelling the mainstream through the filter unit.

(2): After the power unit in front of the tank. At this point suspended material can be filtered off before entering the tank. Material that was formed within the power will directly be filtered off and the risk of deposits in the tank is reduced. The filtration process can be done:

2A: continuously, in the mainstream.

2B: continuously, a certain share of the stream in a parallel setup.

2C: discontinuously, during maintenance or at certain periods by channelling the mainstream through the filter unit.

2D: discontinuously, with a bypass during maintenance without flowing through the power unit.

b. Auxiliary Piping System (3): In an auxiliary piping system connected to the tank that is not connected to the main piping system. At this point suspended material can be filtered off independently from the main piping system. The frequency and pumping speed can be chosen independently in accordance to the grade and type of precipitated material. The filtration process can be done:

3A: continuously, at a certain speed or dependent on the precipitation grade or type.

3B: discontinuously, during maintenance or certain intervals.

All discontinuous filtration modes can be done with a permanently installed setup or a mobile temporary installed setup. The filtration/removal of solid material can be done with, but not limited to, a filter press, a centrifuge, a bag filter or membrane filter. The filtration process can be continuously semi continuously, with a rotating setup or discontinuously.

The material filtered off can then be taken out of the system, optionally neutralized or washed, and used as a raw material for electrolyte production. The performance and capacity of the battery can e.g. be restored by the following means:

1. Addition of new electrolyte solution containing the premixed composition for the redox-flow battery.
2. Addition of concentrated electrolyte solution containing the premixed composition for the redox-flow battery.
3. Addition of a solid material containing the premixed composition for the redox-flow battery.
4. Addition of single components of the electrolyte solution in solid, liquid or suspended form.

Thereby, the premixed composition for the redox flow battery can be:

1. a fixed composition for each electrolyte.
2. a composition that was determined by the specialized analytics prior to or during addition.
3. a composition that was determined by the battery management system or battery control system prior to or during addition.

EXAMPLES

In the following, the present invention is exemplified for the regeneration of a mixture of sodium and potassium ferrocyanide as the posolyte and 7,8-Dihydroxyphenazine-sulfonic acid (DHPS) as the negolyte.

Example 1: Regeneration of Ferrocyanide in Solution

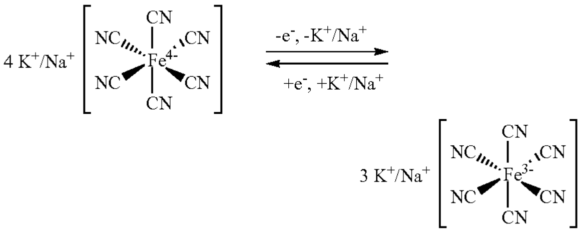

In the present example, a mixture of potassium and sodium ferrocyanide is used as a posolyte for an RFB. The ferrocyanide is the reduced and the ferricyanide the oxidized form representing the discharged and charged state, respectively.

Example 1.a Ferrocyanide Treatment in Solution

The required amount of regeneration reagent (reducing agent) was added to a solution containing 347 mM of sodium/potassium hexacyanoferrate (II) and 257 mM sodium/potassium hexacyanoferrate (III) (SOC 43%) and 0.49 mM base (1:1 mixture of KOH and NaOH). The mixture was stirred for a given time at a given temperature (see Table below). The solution was analyzed by UV-Vis, and the base concentration was determined by titration.

Reaction Equations with Different Regeneration Reagents:

- Sodium sulfite: 0.5 eq $Na_2SO_3$ is required for the reduction of 1 eq $Na_3[Fe(CN)_6]$ $$2\ Na_3[Fe(CN)_6] + Na_2SO_3 + 2NaOH \rightarrow 2\ Na_4[Fe(CN)_6] + Na_2SO_4 + H_2O$$

- Sodium dithionite: 0.16 eq $Na_2S_2O_4$ is required for the reduction of 1 eq $Na_3[Fe(CN)_6]$ $$6\ Na_3[Fe(CN)_6] + Na_2S_2O_4 + 8NaOH \rightarrow 6\ Na_4[Fe(CN)_6] + 2\ Na_2SO_4 + 4\ H_2O$$

- Sodium formate: 0.5 eq HCOONa is required for the reduction of 1 eq $Na_3[Fe(CN)_6]$ $$2\ Na_3[Fe(CN)_6] + HCOONa + 3\ NaOH \rightarrow 2\ Na_4[Fe(CN)_6] + Na_2CO_3 + 2\ H_2O$$

Results:

| Regeneration reagent | Amount | Reaction conditions | SOC and hexacyanoferrate concentration |
|---|---|---|---|
| Sodium sulfite $Na_2SO_3$ | 125 mM | Room temperature, 2 h | SOC 2%, $c(Fe(CN)_6^{2-})$ = 591 mM |
| Potassium sulfite $K_2SO_3$ | 125 mM | Room temperature, 2 h | SOC 0%, $c(Fe(CN)_6^{2-})$ = 587 mM |
| Sodium dithionite $Na_2S_2O_4$ | 50 mM | Room temperature, 2 h | SOC 1%, $c(Fe(CN)_6^{2-})$ = 594 mM |
| Sodium formate HCOONa | 125 mM | 40° C., 43 h | SOC 8%, $c(Fe(CN)_6^{2-})$ = 538 mM |
| Ascorbic acid (as 0.5M solution in 1M KOH/NaOH) | 300 mM | Room temperature, 3 h | SOC 0%, $c(Fe(CN)_6^{2-})$ = 415 mM |

In summary it was shown that the concentration of sodium/potassium hexacyanoferrate (II) in the solution treated was dramatically increased.

Example 2: Treatment of an Iron Complex Precipitate Resulting from an Iron Complex Electrolyte Ferrocyanide is prone to degradation due to external factors such as light, pH, electrochemical reactions, chemical reactions or physical reactions over time. As a result of exposure to such conditions, ferrocyanide changes its chemical or physical properties, such as solubility, electrochemical potential or activity. Reduction of solubility may also be involved such that degradation species may precipitate. Precipitated material may be filtered off and used as an iron source for the production or regeneration of ferrocyanide.

Example 2a

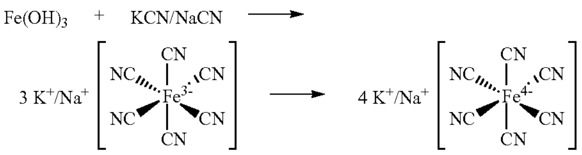

The precipitate of iron (III) hydroxide was treated with a mixture of sodium cyanide (3 eq) and potassium cyanide (3 eq) at 0-120° C., preferably between 20-80° C. to yield sodium/potassium hexacyanoferrate (III). Sodium/potassium hexacyanoferrate (III) was then reduced to sodium/potassium hexacyanoferrate (II) by treatment with a reducing reagent such as sodium sulfite, or sodium dithionite, or sodium formate.

Example 3: Recovery of Negolytes and Posolytes from their Respective Solutions In the following example the separation of negolytes from a posolyte solution or, vice versa, the separation of posolytes from a negolyte solution is shown:

In the following example, the procedure is described for the recovery of (i) DHPS and (ii) potassium/sodium ferrocyanide by treating solutions (as they may occur upon an extended period of cycling in either solution of half-cell A or half-cell B) containing both of (i) and (ii), respectively. This procedure involves the following steps:

a) DHPS was precipitated as acid or as salt from a 1:1 (v/v) mixture of DHPS (0.5 M DHPS in 0.5 M base (NaOH/KOH n/n=1/1)). Potassium/sodium ferrocyanide (0.65 M iron(II) hexacyanide in 0.23 M base (NaOH/KOH n/n=1/1)) by addition of an acid to the electrolyte solution. The precipitated phenazine was separated and further purified. The purified DHPS could be used for preparing an electrolyte solution.

b) The remaining acidic solution contained the iron hexacyanide. Simple addition of base converted the acidic solution to the basic electrolyte. Further separation and purification of the iron hexacyanide was achieved by crystallization from the solution at lower temperatures, preferably below 20° C., or precipitation by addition of inorganic or organic salts that lower the solubility of the hexacyanide. The purified iron hexacyanide can be re-used for preparing an electrolyte solution.

Example 3a: Impact of the pH Value on the Phenazine Purity and Recovery Yield Hydrochloric acid (37%) was added at room temperature to a mixture of 5 mL DHPS (0.5 M DHPS in 0.5 M base (NaOH/KOH n/n=1/1)) and 5 mL potassium/sodium ferrocyanide (0.65 M iron(II) hexacyanide in 0.23 M base (NaOH/KOH n/n=1/1)) to adjust the solution to different pH values. The precipitated electrolyte mixture was dissolved in 2 M potassium hydroxide to a volume on 10 mL. The electrolyte concentrations were determined by HPLC and are summarized in Table 1.

TABLE 1

Recovery of phenazine (sulfonic acid and sulfonate) from a ferrocyanide/DHPS mixture by addition of hydrochloric acid.

| pH value | Iron hexacyanide concentration of the precipitate [mM] | Phenazine concentration of the precipitate [mM] | Phenazine recovery [%] | Phenazine purity [%] |
|---|---|---|---|---|
| 7.3 | 44.4 | 68.2 | 27 | 61 |
| 5.9 | 85.3 | 185.6 | 74 | 69 |
| 3.2 | 138.2 | 243.6 | 97 | 64 |
| 2.2 | 127.7 | 251.7 | 100 | 66 |
| 1.5 | 97.2 | 244.3 | 98 | 72 |

As can be taken from this table, by lowering the pH to less than 6, the recovery yield was significantly improved.

Example 3b: Influence of the pH Value and an Additional Washing of the Precipitate with Diluted Hydrochloric Acid on the Phenazine Purity and Recovery Yield Hydrochloric acid (37%) was added at room temperature to a mixture of 5 mL DHPS (0.5 M DHPS in 0.5 M base (NaOH/KOH n/n=1/1)) and 5 mL potassium/sodium ferrocyanide (0.65 M iron(II) hexacyanide in 0.23 M base (NaOH/KOH n/n=1/1)) to adjust the solution to different pH values. The precipitated electrolyte mixture was washed with 1.2 M hydrochloric acid and dissolved in 2 M potassium hydroxide to a volume on 10 mL. The electrolyte concentrations were determined by HPLC and are summarized in Table 2.

TABLE 2

Recovery of phenazine (sulfonic acid and sulfonate) from a ferrocyanide/DHPS mixture by addition of hydrochloric acid and an additional washing of the precipitate with diluted hydrochloric acid.

| pH value | ferrocyanide concentration of the precipitate [mM] | Phenazine concentration of the precipitate [mM] | Phenazine recovery [%] | Phenazine purity [%] |
|---|---|---|---|---|
| 2.2 | 21 | 250 | 100 | 92 |
| 0.5 | 22 | 226 | 90 | 91 |

In summary, it was that it is possible to separate mixed electrolytes by varying the pH value.

Technical Supportings:

All chemicals and solvents were used as bought.

Electrochemical Tests:

For electrochemical characterization, a small laboratory cell was used. A graphite felt (with an area of 6 $cm^2$, 6 mm in thickness, supplier: SGL GFA 6EA) was employed as both the positive and negative electrode, and a cation exchange membrane (630K or 620PE, supplier: fumatech) was used to separate the positive and negative electrolytes. The membrane was conditioned in 0.5 M KOH/NaOH (50/50) for at least 150 h prior to each test. Electrolyte volumes range from 12 to 50 mL. The electrolytes were pumped by peristaltic pumps (Drifton BT100-1L, Cole Parmer Ismatec MCP and BVP Process IP 65) at a rate of 24 mL/min to the corresponding electrodes, respectively. Electrochemical testing was performed on a BaSyTec (BaSyTec GmbH, 89176 Asselfingen, Germany) or a Bio-Logic (Bio-Logic Science Instruments, Seyssinet-Pariset 38170, France) battery test system by polarization curves, which were recorded in the charged state by galvanostatic holds and constant-current charge-discharge cycles. For cycling, the cell was charged at a current density of 25 $mA/cm^2$ up to 1.7 V and discharged at the same current density down to 0.8 V cut-off.

Analytical Methods:

UV-VIS Spectroscopy

Parameter for UV-Vis Measurement:

Device: PerkinElmer Lambda25
Layer thickness cuvette: 10 mm
Temperature: 22.5° C.±2.5° C.
Detection: 200-700 nm
Scan speed: 480 nm/min
Slit: 1 nm
Solvent for measurement: $H_3PO_4$ (25 mM)

An aqueous solution of the substance (0.1 M) was diluted with phosphorus acid (25 mM) to a final substance concentration of 2 μM. A "Hellma Makro UV-6030" cuvette was used for the measurement.

Infrared Spectroscopy

Parameter for IR Measurement:

Device: Bruker Vector 22
Temperature: 22.5° C.±2.5° C.
Range: 550-4000 $cm^{-1}$ A small amount of the substance was applied to the crystal of the ATR unit.

High-Performance Liquid Chromatography (HPLC)

Device: Hitachi Chromaster
Column: Merck Chromolith® HighResolution RP-18e 4.6×100 mm
Temperature: 40° C.
Detection: 250/280 nm
Solvent sample: Ammonium acetate 0.2 M
Concentration
sample: <0.5 mg/ml
Inj. Volume: 2 μl

| Gradient: | | | | |
|---|---|---|---|---|
| Time [min] | $H_2O$ % | $H_3PO_4$ (0.5M) % | Acetonitrile % | Flow [ml/min] |
| 0.00 | 95.0 | 5.0 | 0.0 | 2,000 |
| 0.50 | 95.0 | 5.0 | 0.0 | 2,000 |
| 6.50 | 75.0 | 5.0 | 25.0 | 2,000 |
| 7.00 | 5.0 | 5.0 | 90.0 | 2,000 |
| 7.50 | 5.0 | 5.0 | 90.0 | 2,000 |
| 8.00 | 95.0 | 5.0 | 0.0 | 2,500 |
| 10.00 | 95.0 | 5.0 | 0.0 | 2,500 |

Mass Spectrometry

Parameter for MS Measurement:

Device: Waters micromass triple quad
Detection: 50-1000 m/z
Ionization mode: ESI−

The invention claimed is:

1. A process for the regeneration of an aqueous electrolyte solution of a redox-flow battery containing at least one inorganic redox active compound, said process comprising:
removing precipitated material from the electrolyte solution and modifying the precipitated material to obtain at least one water soluble inorganic redox active compound,
wherein modifying the precipitated material involves treatment of the precipitate with a cyanide.

2. The process according to claim 1, wherein the at least one inorganic redox active compound is selected from a metal ion complex.

3. The process according to claim 1, wherein the precipitated material is removed from the electrolyte solution by filtration or centrifugation.

4. The process according to claim 1, wherein the process further comprises:
separating inorganic redox active compounds from redox active compounds other than the at least one inorganic redox active compound,
wherein the redox active compounds other than the at least one inorganic redox active compound are phenazine compounds or substituted phenazine compounds.

5. The process according to claim 1, wherein the process further comprises:
treating the electrolyte solution in order to reduce the at least one inorganic redox active compound to the reduced state,
wherein reducing the at least one inorganic redox active compound is carried out using a reducing agent.

6. The process according to claim 2, wherein the metal ion complex is an iron metal ion complex.

7. The process according to claim 6, wherein the iron metal ion complex is $M_3[Fe(CN)_6]$ and $M_4[Fe(CN)_6]$, wherein M is a cation.

8. The process according to claim 7, wherein the cation is sodium, potassium, ammonium, or a mixture thereof.

9. The process according to claim 5, wherein the reducing agent is sodium sulfite, potassium sulfite, sodium dithionite, sodium formate, formic acid, and/or ascorbic acid.

10. The process according to claim 1, wherein the precipitated material is removed from the electrolyte solution by filtration.

11. The process according to claim 1, wherein the cyanide is KCN and/or NaCN.

12. A process for the regeneration of an aqueous electrolyte solution of a redox-flow battery containing at least one inorganic redox active compound, said process comprising:
separating inorganic redox active compounds from redox active compounds other than the at least one inorganic redox active compound,
wherein the redox active compounds other than the at least one inorganic redox active compound are phenazine compounds or substituted phenazine compounds.

13. The process according to claim 12, wherein the at least one inorganic redox active compound is selected from a metal ion complex.

14. The process according to claim 13, wherein the metal ion complex is an iron metal ion complex.

15. The process according to claim 14, wherein the iron metal ion complex is $M_3[Fe(CN)_6]$ and $M_4[Fe(CN)_6]$, wherein M is a cation.

16. The process according to claim 15, wherein the cation is sodium, potassium, ammonium, or a mixture thereof.

17. The process according to claim 12, wherein the phenazine compounds or substituted phenazine compounds are separated from the electrolyte solution by decreasing the pH value of the solution.

18. The process according to claim 17, wherein the pH value is decreased to a pH of 7 or lower.

19. The process according to claim 18, wherein the pH value is decreased to a pH of 3.5 or lower.

20. The process according to claim 17, wherein the pH value is decreased using inorganic or organic acids.

21. The process according to claim 12, wherein the process further comprises:

removing precipitated material from the electrolyte solution and modifying the precipitated material to obtain at least one water soluble inorganic redox active compound, wherein the subsequent modification of the precipitated material involves treatment of the precipitate with a cyanide.

* * * * *